United States Patent
Dong (10) Patent No.: US 8,396,418 B2
(45) Date of Patent: Mar. 12, 2013

(54) MICROWAVE RELAY RECEIVING METHOD AND APPARATUS, MICROWAVE RELAY TRANSMITTING METHOD AND APPARATUS, AND MICROWAVE RELAY NODE

(75) Inventor: Limin Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/470,016

(22) Filed: May 11, 2012

(65) Prior Publication Data

US 2012/0220215 A1    Aug. 30, 2012

Related U.S. Application Data

(63) Continuation of application No. PCT/CN2010/078602, filed on Nov. 10, 2010.

(30) Foreign Application Priority Data

Nov. 13, 2009    (CN) .......................... 2009 1 0207185

(51) Int. Cl.
     *H04B 7/15*      (2006.01)
(52) U.S. Cl. ............... 455/11.1; 455/9; 455/15; 455/20; 455/23; 455/41.2; 455/3.05; 370/315; 370/492; 370/501; 375/211
(58) Field of Classification Search ............... 455/11.1, 455/7, 9, 13.1, 15, 16, 17, 20, 22, 23, 24, 455/41, 450, 455, 3.05, 41.2, 3.052; 370/278, 370/279, 293, 274, 315, 492, 501; 375/211, 375/214
See application file for complete search history.

(56) References Cited

U.S. PATENT DOCUMENTS

| | | | | |
|---|---|---|---|---|
| 4,017,856 | A | * | 4/1977 | Wiegand ........................ 342/15 |
| 4,506,383 | A | * | 3/1985 | McGann ........................ 455/17 |
| 2008/0254743 | A1 | * | 10/2008 | Nishikawa et al. ............. 455/24 |
| 2009/0097433 | A1 | | 4/2009 | Shen et al. |
| 2011/0116439 | A1 | * | 5/2011 | Kawasaki ..................... 370/315 |

FOREIGN PATENT DOCUMENTS

| | | |
|---|---|---|
| CN | 101064547 A | 10/2007 |
| CN | 101317344 A | 12/2008 |
| CN | 101730251 A | 6/2010 |
| KR | 20090091934 A | 8/2009 |

OTHER PUBLICATIONS

International Written Opinion dated Feb. 10, 2011 in connection with International Patent Application No. PCT/CN2010/078602, 5 pages.
International Search Report dated Feb. 10, 2011 in connection with International Patent Application No. PCT/CN2010/078602.

* cited by examiner

*Primary Examiner* — Shaima Q Aminzay (57) ABSTRACT

An embodiment of the present invention discloses a microwave relay receiving method and apparatus, a microwave relay transmitting method and apparatus, and a microwave relay node. The embodiment of the present invention relates to the field of communications technologies and is invented to enable free scheduling of microwave signals at low costs. The microwave relay receiving method includes: receiving a microwave signal; separating the microwave signal to obtain service information at an intermediate frequency band and control information at a low frequency band and sending the separated service information to a switch matrix; and sending the control information to the switch matrix so that a corresponding switch in the switch matrix is turned on and the service information is transmitted by the turned on switch.

7 Claims, 7 Drawing Sheets

MICROWAVE RELAY RECEIVING METHOD AND APPARATUS, MICROWAVE RELAY TRANSMITTING METHOD AND APPARATUS, AND MICROWAVE RELAY NODE

CROSS-REFERENCE TO RELATED APPLICATIONS

This application is a continuation of International Application No. PCT/CN2010/078602, filed on Nov. 10, 2010, which claims priority to Chinese Patent Application No. 200910207185.2, filed on Nov. 13, 2009, both of which are hereby incorporated by reference in their entireties.

TECHNICAL FIELD

The present invention relates to the field of communications technologies, and in particular, to a microwave relay receiving method and apparatus, a microwave relay transmitting method and apparatus, and a microwave relay node.

BACKGROUND

Figure 1:
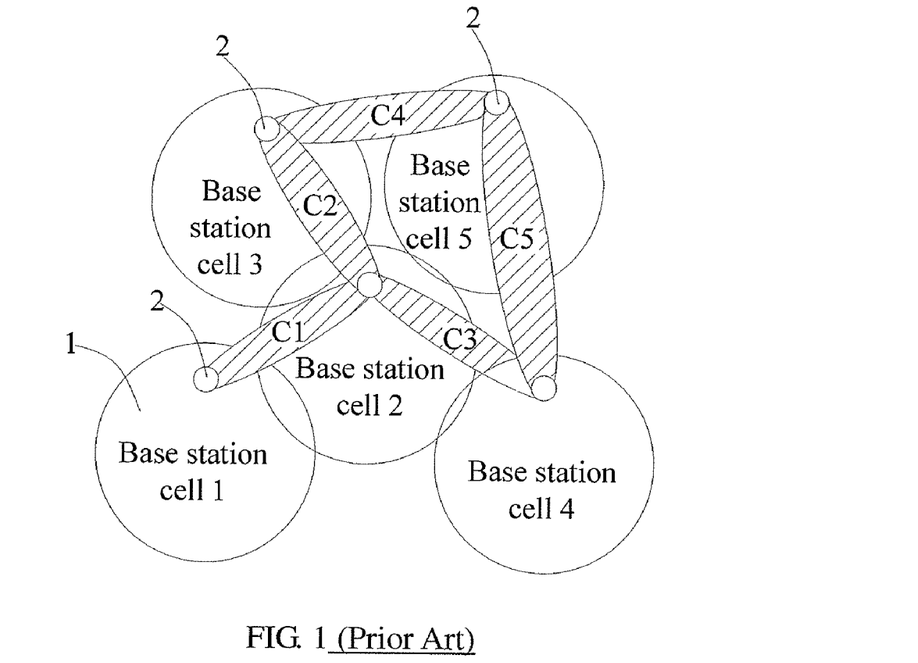
FIG. 1 is a schematic diagram of a base station mesh network made up of E-band microwave in a prior art.

E-band microwaves are mainly used in the backhaul of mobile base stations. Base stations are widely deployed in urban areas and change with the landform and the city layout. Therefore, E-band microwave may be used to form a mesh network to connect the base stations. As shown in FIG. 1, a microwave node 2 is distributed in a base station cell 1 of a mesh network, and E-band microwave links are established among microwave nodes 2. To realize a link between two microwave nodes 2 that are far from each other, several intermediate microwave nodes may be disposed between the two nodes. An intermediate microwave node always needs to connect links from multiple directions, and therefore requires a multi-directional antenna.

Figure 2:
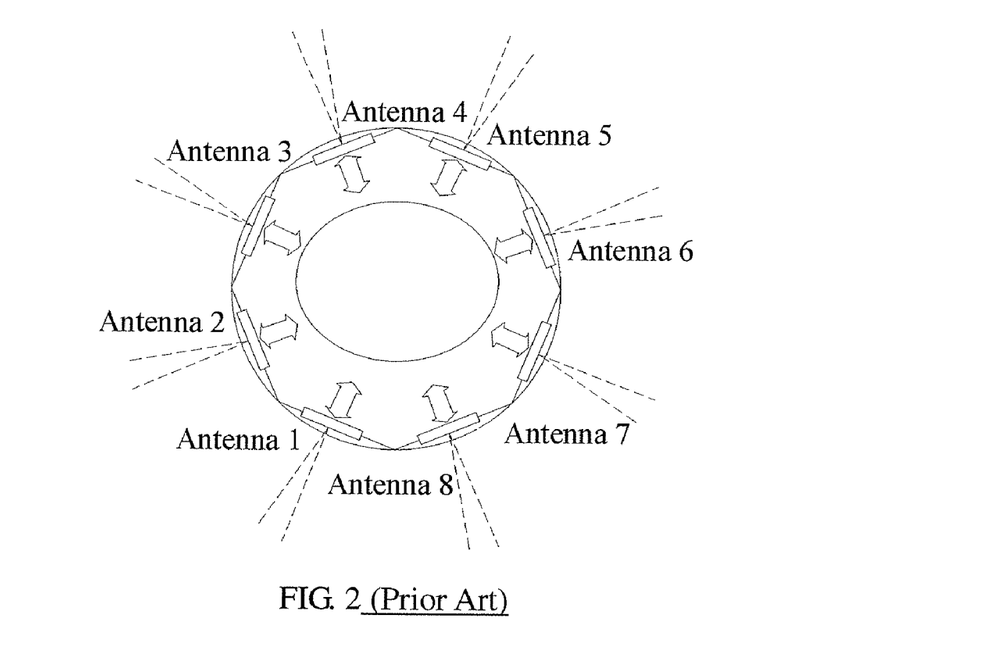
FIG. 2 is a schematic structure diagram of a multi-directional antenna supporting eight directions in a prior art.

FIG. 2 shows a multi-directional antenna supporting eight directions. An intermediate microwave node consisted of the multi-directional antenna implements the relay of microwave signals according to the need of service scheduling, to perform service scheduling. For example, an antenna 1 receives a microwave signal in one direction and sends the microwave signal to an antenna 4 in another direction, and then the antenna 4 transmits the microwave signal.

Figure 3:
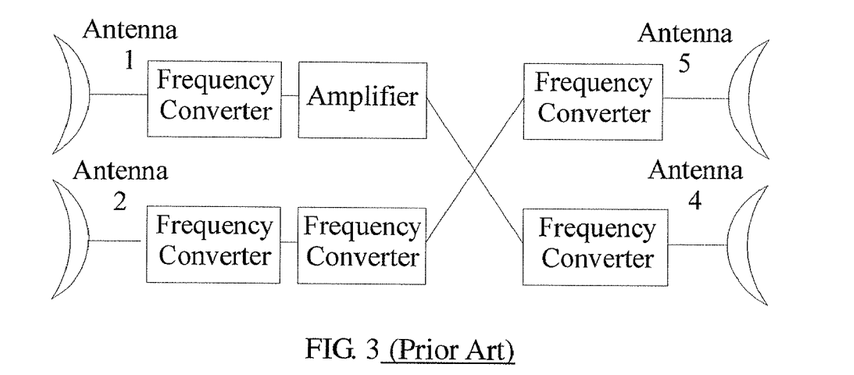
FIG. 3 is a schematic diagram of a structure that implements a microwave relay in a prior art.

FIG. 3 illustrates a structure that implements a microwave relay in a prior art, where electrical cables are used to connect an antenna 1 and an antenna 4, and connect an antenna 2 and an antenna 5. The antenna 1 in one direction receives a microwave signal. The signal is amplified and frequency converted and then sent to the antenna 4 in another direction, and finally transmitted by the antenna 4. Because there is no physical electrical cables connection between the antenna 1 and the antenna 5, the signal received by the antenna 1 cannot be transmitted in the direction of the antenna 5. Because antennas in different directions are connected through fixed lines, the multi-directional antenna cannot schedule the service of a received signal freely according to the need of the service.

Figure 4:
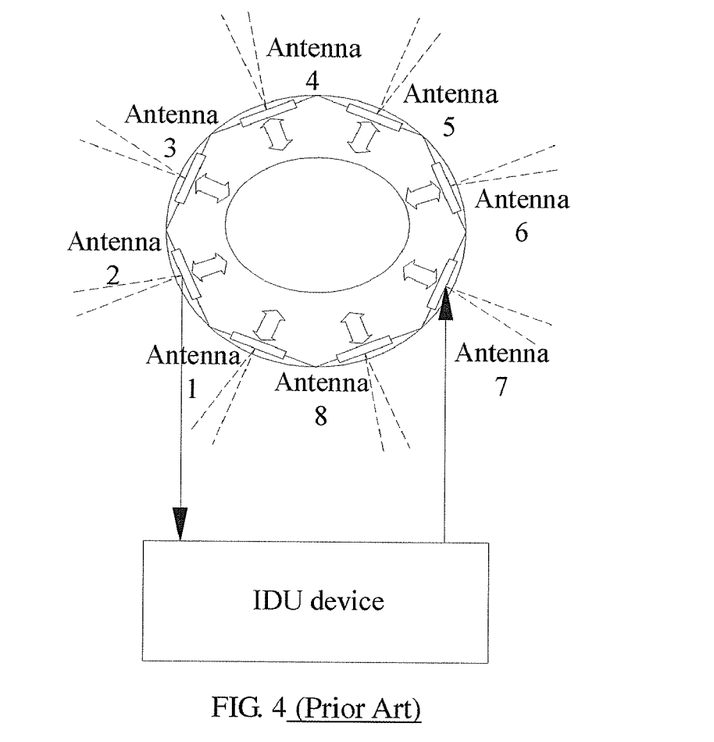
FIG. 4 is another schematic diagram of a structure that implements a microwave relay in a prior art.

FIG. 4 illustrates another structure that implements a microwave relay in a prior art, where a multi-directional antenna is connected to an indoor unit (IDU) device 4. The IDU device 4 is capable of transmitting a microwave signal received by an antenna in one direction (such as an antenna 2) through an antenna in another direction (such as an antenna 7) to implement the scheduling of services. The service scheduling process includes: converting a microwave radio frequency (RF) signal to an intermediate frequency signal at first, then demodulating the intermediate frequency signal to obtain a service data stream, and finally scheduling the service at the service layer. Because scheduling is not performed directly at the intermediate frequency layer, an additional cost is caused.

During the implementation of the preceding application, the inventor finds at least the following weakness in the prior arts:

It is difficult for the prior microwave relay methods and apparatuses to implement free scheduling of signals at low costs.

SUMMARY

Technical problems to be solved by embodiments of the present invention is providing a microwave relay receiving method and apparatus, a microwave relay transmitting method and apparatus, and a microwave relay node to enable free scheduling of microwave signals at low costs.

Embodiments of the present invention adopt the following technical solution:

A microwave relay receiving method, which includes: receiving a microwave signal which includes service information and control information; separating the microwave signal to obtain the service information at an intermediate frequency band and the control information at a low frequency band, and sending the separated service information to a switch matrix, where the switch matrix is connected between a relay receiving apparatus and a relay transmitting apparatus of the microwave signal and used to schedule and distribute the service information in the microwave signal; and sending the control information to the switch matrix so that a corresponding switch in the switch matrix is turned on and the service information is transmitted by the turned on switch.

A microwave relay transmitting method, which includes: generating control information at a low frequency band, where the control information is used to control the turn-on of a switch in a switch matrix, where the switch matrix is connected between a receiving apparatus and a transmitting apparatus of the microwave signal and used to schedule and distribute service information in the microwave signal; mixing the control information at the low frequency band and service information at an intermediate frequency band to create a microwave signal; and transmitting the microwave signal.

An embodiment of the present invention further provides a microwave relay receiving apparatus, which includes:
a receiving unit, configured to receive a microwave signal which includes service information and control information; a separating unit, configured to separate the microwave signal to obtain the service information at an intermediate frequency band and the control information at a low frequency band and send the separated service information to a switch matrix, where the switch matrix is connected between a relay receiving apparatus and a relay transmitting apparatus of the microwave signal and used to schedule and distribute the service information in the microwave signal; and a controlling unit, configured to send the control information to the switch matrix so that a corresponding switch in the switch matrix is turned on and the service information is transmitted by the turned on switch.

An embodiment of the present invention further provides a microwave relay transmitting apparatus, which includes:
a control information generating unit, configured to generate control information at a low frequency band, where the control information is used to control the turn-on of a switch in a switch matrix, where the switch matrix is connected between a receiving apparatus and a transmitting apparatus of the microwave signal and used to schedule and distribute service information in the microwave signal; a mixing unit, configured to mix the control information at the low frequency band and service information at: an intermediate frequency band to create a microwave signal; and a transmitting unit, configured to transmit the microwave signal.

An embodiment of the present invention further provides a microwave relay node, which includes a microwave relay receiving apparatus, a switch matrix and a microwave relay transmitting apparatus, where the switch matrix is connected between the microwave relay receiving apparatus and the microwave relay transmitting apparatus, where:

the microwave relay receiving apparatus is configured to: receive a microwave signal which includes service information and first control information; separate the microwave signal to obtain the service information at an intermediate frequency band and the first control information at a low frequency band, and send the separated service information to the switch matrix; and send the first control information to the switch matrix to turn on a switch in the switch matrix;

the switch matrix is configured to turn on the corresponding switch according to the first control information to schedule and distribute the service information in the microwave signal received by the microwave relay receiving apparatus to the microwave relay transmitting apparatus; and the microwave relay transmitting apparatus is configured to receive the service information scheduled and distributed by the switch matrix and transmit the service information.

With the microwave relay receiving and transmitting methods and apparatuses provided by the embodiments of the present invention, service information at the intermediate frequency band and control information at the low frequency band can be separated from a microwave signal, and a corresponding switch in a switch matrix can be turned on according to the control information to transmit the service information. Thus, services can be scheduled freely at the intermediate frequency layer, and the cost can be reduced, thereby enabling free scheduling of microwave signals at low costs.

BRIEF DESCRIPTION OF THE DRAWINGS

To describe the technical solution in the embodiments of the present invention or in the prior art more clearly, the following outlines the accompanying drawings required in the description of the embodiments of the present invention or the prior art. Apparently, the following accompanying drawings illustrate only some exemplary embodiments of the present invention, and those skilled in the art can derive other drawings from these drawings without creative efforts.

DETAILED DESCRIPTION

The present invention aims to providing a microwave relay receiving method and apparatus, a microwave relay transmitting method and apparatus, and a microwave relay node to enable free scheduling of microwave signals at low costs. The present invention is described in detail with reference to the accompanying drawings.

It should be noted that the described embodiments are only some exemplary embodiments of the present invention but not all embodiments of the present invention. Based on the embodiments herein, those skilled in the art can derive other embodiments without creative efforts, and such other embodiments all fall within the scope of the present invention.

Figure 5:
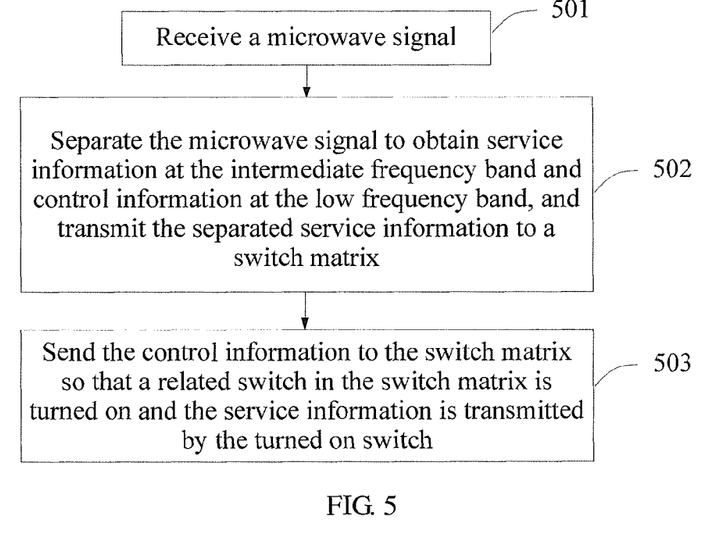
FIG. 5 is a flowchart of a microwave relay receiving method according to an embodiment of the present invention.

As shown in FIG. 5, an embodiment of the present invention provides a microwave relay receiving method, which includes the following steps:

Step 501: Receive a microwave signal which includes service information and control information.

In this step, the microwave signal may be received by a receiving unit, and the received microwave signal is located at the RF band. Taking a multi-directional antenna as an example, the receiving unit may be an antenna in the antenna apparatus in one direction of the multi-directional antenna.

Step 502: Separate the microwave signal to obtain the service information at the intermediate frequency band and the control information at the low frequency band and send the separated service information to a switch matrix, where the switch matrix is connected between the relay receiving apparatus and the relay transmitting apparatus of the microwave signal and used to schedule and distribute the service information in the microwave signal.

In this step, the microwave signal may be separated by a separating unit. Specifically, because the service information is located at the intermediate frequency band, while the control information is located at the low frequency band, a high-pass filter and a low-pass filter may be used to filter the microwave signal to obtain the service information and the control information respectively. In this case, the separating unit may include elements such as a high-pass filter and a low-pass filter.

Therefore, separating the microwave signal includes: down-converting the received microwave signal to obtain a microwave signal at the intermediate frequency band at first; then performing high-pass filtering on one portion of the microwave signal at the intermediate frequency band to obtain the service information at the intermediate frequency band and sending the information to the switch matrix; and performing low-pass filtering and analog/digital (A/D) demodulation on the other portion of the microwave signal at the intermediate frequency band to obtain the control information at the low frequency band.

It should be noted that the switch matrix described in this embodiment is consisted of switches that enable intermediate frequency signals to pass, and may be selected according to the bandwidth range of intermediate frequency signals, so that the switch matrix is able to transmit service information at the intermediate frequency band.

Step 503: Send the control information to the switch matrix so that a corresponding switch in the switch matrix is turned on, and the service information is transmitted by the turned on switch.

In this step, the control information may be sent by a controlling unit to the switch matrix to turn on the corresponding switch in the switch matrix. The controlling unit may include a modem, configured to convert an analog signal to a digital signal, and a controller, configured to convert the control information to a control signal.

Therefore, sending the control information to the switch matrix so that the corresponding switch in the switch matrix is turned on includes: converting the control information obtained in step 502 to a control signal according to a pre-stored control protocol at first, and then sending the control signal to the switch matrix, where the control signal is used to control the turn-on of the corresponding switch in the switch matrix. Specifically, the control signal may be a series of high- and low-level signals. When the control signal corresponding to a switch in the switch matrix is at a high level, the switch is turned on. Otherwise, when the control signal corresponding to a switch in the switch matrix is at a low level, the switch is turned off.

In addition, the control protocol includes routing information for transmission of the microwave signal, and the control signal controls the turn-on of the switch corresponding to the routing information in the switch matrix. Therefore, which switch in the switch matrix should be turned on may be known according to the routing information, and thereby the corresponding control signal is generated to control the turn-on of the switch.

With the microwave relay receiving method provided by the embodiment of the present invention, service information at the intermediate frequency band and control information at the low frequency band can be separated from a microwave signal, and a corresponding switch in a switch matrix is turned on according to the control information to transmit the service information. Thus, services can be scheduled freely at the intermediate frequency layer, and the cost can be reduced, thereby enabling free scheduling of microwave signals at low costs.

Figure 6:
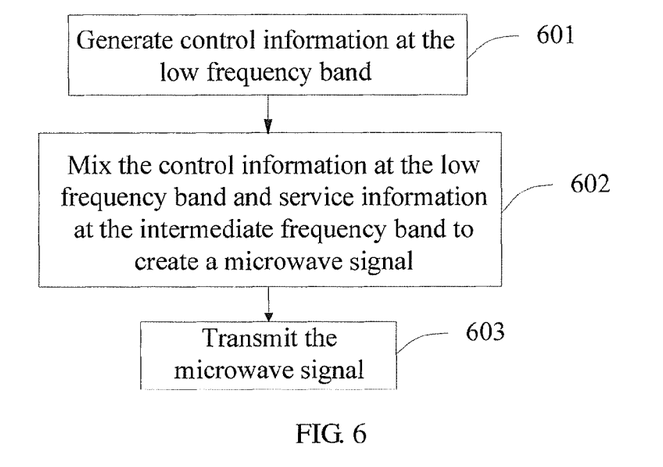
FIG. 6 is a flowchart of a microwave relay transmitting method according to an embodiment of the present invention.

As shown in FIG. 6, an embodiment of the present invention provides a microwave relay transmitting method, which includes the following steps:

Step 601: Generate control information at the low frequency band, where the control information is used to control the turn-on of a switch in a switch matrix.

In this step, the control information at the low frequency band may be generated by a control information generating unit. Specifically, the control information generating unit may include a controller configured to generate a control signal, and may further include a modem configured to modulate the control signal onto a low frequency carrier to generate the control information.

Therefore, generating control information at the low frequency band includes: modulating a control signal used to control the turn-on of a switch in a switch matrix onto a low frequency carrier according to a pre-stored control protocol to generate the control information at the low frequency band.

The frequency of the low frequency carrier may be several kilohertz, and the low frequency carrier may be a sine wave or square wave.

Step 602: Mix the control information at the low frequency band and the service information at the intermediate frequency band to create a microwave signal, where the switch matrix is connected between the receiving apparatus and the transmitting apparatus of the microwave signal and used to schedule and distribute service information in the microwave signal.

In this step, the control information at the low frequency band and the service information at the intermediate frequency band may be mixed by a mixing unit. Specifically, the mixing unit may include an up-converter configured to up-convert the service information and the control information and perform mixed-frequency modulation on the information to obtain a microwave signal at the RF band. In addition, the mixing unit may further include a preamplifier and a power amplifier to amplify the microwave signal.

Therefore, mixing the control information at the low frequency band and the service information at the intermediate frequency band includes: up-converting the control information at the low frequency band and the service information at the intermediate frequency band, and performing mixed-frequency modulation to thereby obtain a microwave signal at the RF band. The control information at the low frequency band comes from the control information obtained in step 601, while the service information at the intermediate frequency band comes from the service information transmitted by the switch matrix in step 503 of the previous embodiment of the present invention.

Step 603: Transmit the microwave signal.

In this step, the microwave signal may be transmitted by a transmitting unit, and the microwave signal is located at the RF band. Taking a multi-directional antenna as an example, the transmitting unit may be an antenna in the antenna apparatus in one direction of the multi-directional antenna.

With the microwave relay transmitting method provided by the embodiment of the present invention, service information at the intermediate frequency band and control information at the low frequency band can be mixed into a microwave signal and transmitted together, so that a microwave node receiving the microwave signal can schedule the service freely at the intermediate frequency layer and the cost thus is reduced, thereby enabling free scheduling of microwave signals at low costs.

Figure 7:
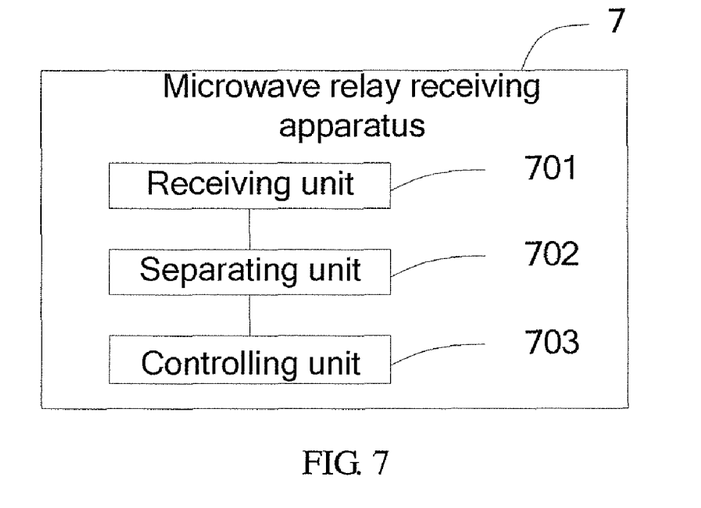
FIG. 7 is a schematic structure diagram of a microwave relay receiving apparatus according to an embodiment of the present invention.

As shown in FIG. 7, an embodiment of the present invention provides a microwave relay receiving apparatus 7, which includes:

A receiving unit 701, configured to receive a microwave signal which includes service information and control information.

Taking a multi-directional antenna as an example, the receiving unit 701 may be an antenna in the antenna apparatus in one direction of the multi-directional antenna.

A separating unit 702, configured to separate the microwave signal to obtain the service information at the intermediate frequency band and the control information at the low frequency band, and send the separated service information to a switch matrix, where the switch matrix is connected between the relay receiving apparatus and the relay transmitting apparatus of the microwave signal and used to schedule and distribute the service information in the microwave signal.

The separating unit 702 may first down-convert the received microwave signal to obtain a microwave signal at the intermediate frequency band. Then the separating unit 702 may perform high-pass filtering on one portion of the microwave signal at the intermediate frequency band to obtain the service information at the intermediate frequency band and perform low-pass filtering and A/D demodulation on the other portion of the microwave signal at the intermediate frequency band to obtain the control information at the low frequency band.

In addition, the switch matrix in this embodiment is consisted of switches that enable intermediate frequency signals to pass, and may be selected according to the bandwidth range of intermediate frequency signals so that the switch matrix is able to transmit service information at the intermediate frequency band.

A controlling unit 703, configured to send the control information to the switch matrix so that a corresponding switch in the switch matrix is turned on and the service information is transmitted by the turned on switch.

The controlling unit 703 may be configured to convert the control information obtained by the separating unit 702 to a control signal according to a protocol pre-stored in the controlling unit 703 and send the control signal to the switch matrix, where the control signal is used to turn on the corresponding switch in the switch matrix. Specifically, the control signal may be a series of high- and low-level signals. When the control signal corresponding to a switch in the switch matrix is at a high level, the switch is turned on. Otherwise, when the control signal corresponding to a switch in the switch matrix is at a low level, the switch is turned off.

In addition, if the control protocol includes routing information for transmission of the microwave signal, the control signal is used to control the turn-on of the switch corresponding to the routing information in the switch matrix. Therefore, which switch in the switch matrix should be turned on may be known according to the routing information, and thus the corresponding control signal is generated to control the turn-on of the switch.

With the microwave relay receiving apparatus 7 provided by the embodiment of the present invention, the separating unit 702 separates service information at the intermediate frequency band and control information at the low frequency band from a microwave signal, and the controlling unit 703 turns on a corresponding switch in a switch matrix according to the control information to transmit the service information. Thus, services can be scheduled freely at the intermediate frequency layer, and the cost can be reduced, thereby enabling free scheduling of microwave signals at low costs.

Figure 8:
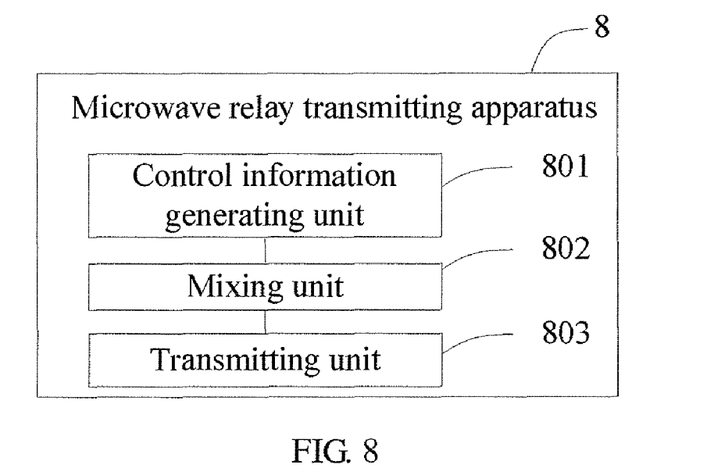
FIG. 8 is a schematic structure diagram of a microwave relay transmitting apparatus according to an embodiment of the present invention.

As shown in FIG. 8, an embodiment of the present invention provides a microwave relay transmitting apparatus 8, which includes:

A control information generating unit 801, configured to generate control information at the low frequency band, where the control information is used to control the turn-on of a switch in a switch matrix.

Specifically, the control information generating unit 801 is configured to modulate a control signal used to control the turn-on of a switch in a switch matrix onto a low frequency carrier according to a pre-stored control protocol to generate the control information at the low frequency band.

The frequency of the low frequency carrier may be several kilohertz, and the low frequency carrier may be a sine wave or square wave.

A mixing unit 802, configured to mix the control information at the low frequency band and the service information at the intermediate frequency band to create a microwave signal, where the switch matrix is connected between the receiving apparatus and the transmitting apparatus of the microwave signal and used to schedule and distribute service information in the microwave signal.

Specifically, the mixing unit 802 is configured to up-convert the control information at the low frequency band and the service information at the intermediate frequency band to perform mixed-frequency modulation to thereby obtain a microwave signal at the RF band. The control information at the low frequency band comes from the control information generated by the control information generating unit 801, while the service information at the intermediate frequency band comes from the service information transmitted by the switch matrix under the control of the controlling unit 703 in the previous embodiment of the present invention.

A transmitting unit 803, configured to transmit the microwave signal.

Taking a multi-directional antenna as an example, the transmitting unit 803 may be an antenna in the antenna apparatus in one direction of the multi-directional antenna.

With the microwave relay transmitting apparatus 8 provided by the embodiment of the present invention, service information at the intermediate frequency band and control information at the low frequency band are mixed into a microwave signal by the mixing unit 802 and are transmitted together, so that a microwave node receiving the microwave signal can schedule the service freely at the intermediate frequency layer, and thus the cost is reduced, thereby enabling free scheduling of microwave signals at low costs.

Figure 9:
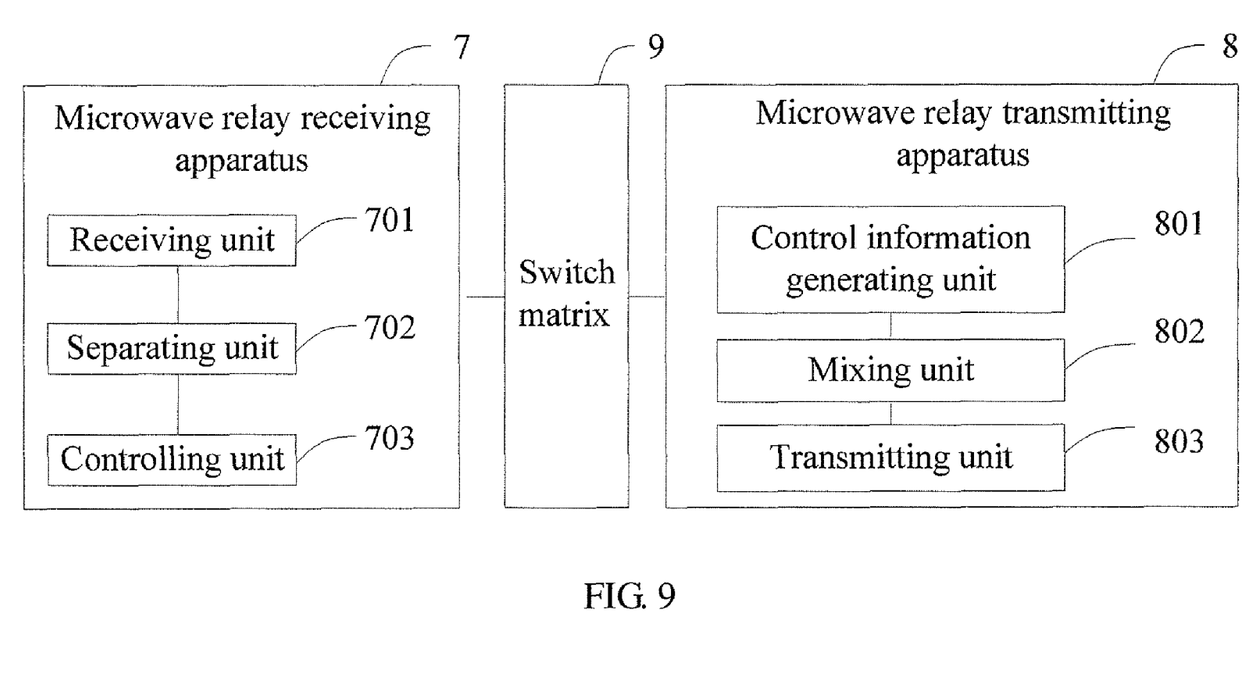
FIG. 9 is a schematic structure diagram of a microwave relay node according to an embodiment of the present invention.

As shown in FIG. 9, an embodiment of the present invention provides a microwave relay node, which includes a microwave relay receiving apparatus 7, a switch matrix 9, and a microwave relay transmitting apparatus 8, where the switch matrix 9 is connected between the microwave relay receiving apparatus 7 and the microwave relay transmitting apparatus 8, where:

The microwave relay receiving apparatus 7 is configured to: receive a microwave signal which includes service information and first control information; separate the microwave signal to obtain the service information at the intermediate frequency band and the first control information at the low frequency band, and send the separated service information to the switch matrix 9; and transmit the first control information to the switch matrix 9 to turn on a corresponding switch in the switch matrix 9.

The switch matrix 9 is configured to turn on the corresponding switch according to the first control information to schedule and distribute the service information in the microwave signal received by the microwave relay receiving apparatus 7 to the microwave relay transmitting apparatus 8.

The microwave relay transmitting apparatus 8 is configured to receive the service information scheduled and distributed by the switch matrix 9 and transmit the service information.

The switch matrix is consisted of switches that enable intermediate frequency signals to pass, and may be selected according to the bandwidth range of intermediate frequency signals so that the switch matrix is able to transmit service information at the intermediate frequency band. For example, the switches may be the NC6433 series switches produced by ON Semiconductor.

With the microwave relay node provided by the embodiment of the present invention, the microwave relay receiving apparatus 7 separates service information at the intermediate frequency band and control information at the low frequency band from a microwave signal and turns on a corresponding switch in the switch matrix 9 according to the control information to transmit the service information; and the microwave relay transmitting apparatus 8 mixes the service information at the intermediate frequency band and the control information at the low frequency band into a microwave signal and transmits the information together, so that services can be scheduled freely at the intermediate frequency layer, and thus the cost can be reduced, thereby enabling free scheduling of microwave signals at low costs.

The microwave relay node includes at least one multi-directional antenna, where the microwave relay receiving apparatus 7 is an antenna apparatus in one direction of the multi-directional antenna and the microwave relay transmitting apparatus 8 is an antenna apparatus in another direction of the multi-directional antenna. In the microwave relay node, the microwave relay receiving apparatus 7 receives a microwave signal transmitted by a previous microwave node and sends the service information in the microwave signal to the microwave relay transmitting apparatus 8 through the switch matrix 9; whereby the microwave relay transmitting apparatus 8 transmits the microwave signal to a next microwave node. Thus, the service scheduling function of the microwave relay node is implemented.

Figure 10:
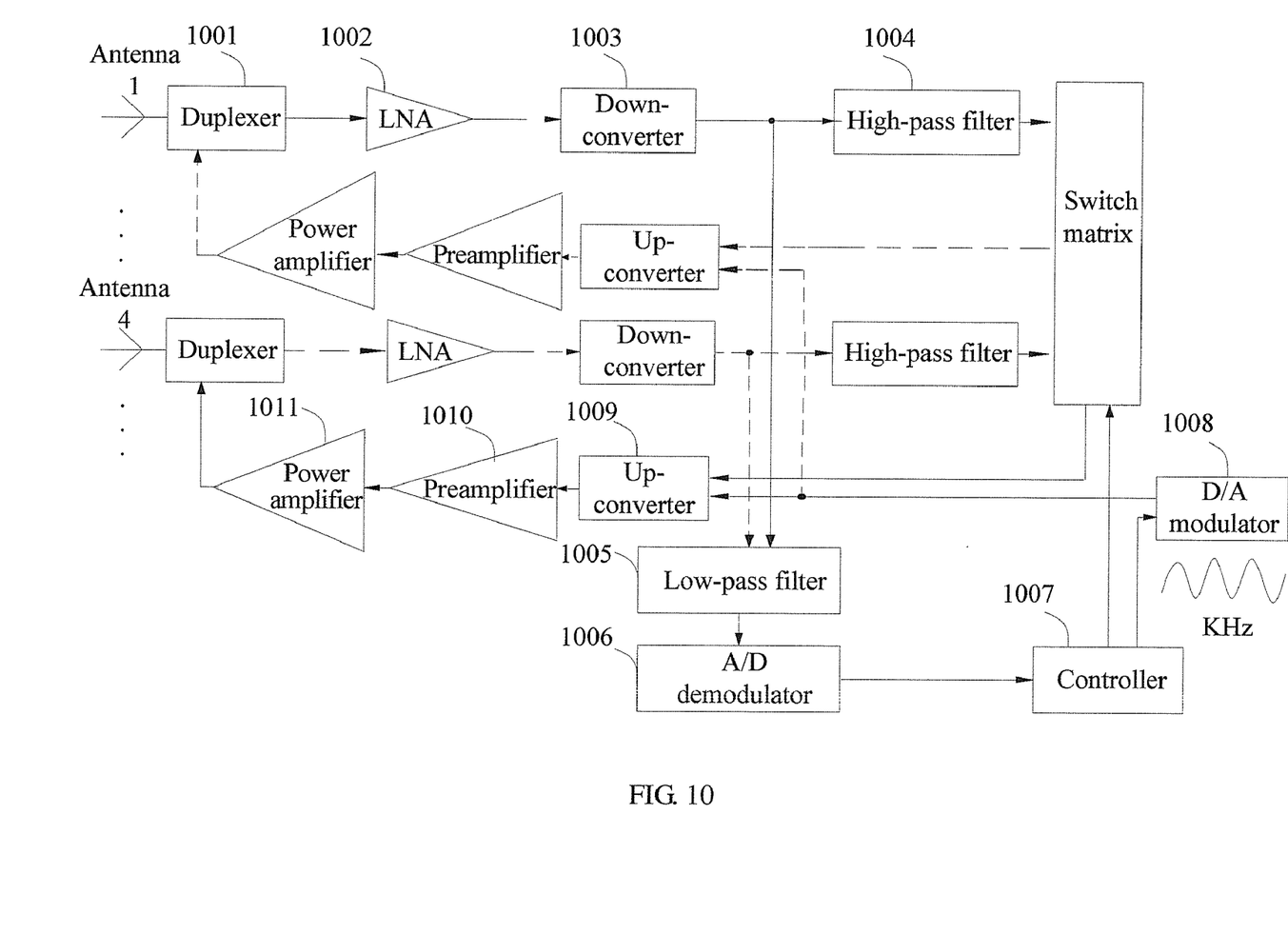
FIG. 10 is a schematic diagram of a structure that implements a microwave relay node according to an embodiment of the present invention.

As shown in FIG. 10, a specific structure of the microwave relay node is illustrated in combination with a specific embodiment.

In FIG. 10, the microwave relay node includes a multi-directional antenna supporting eight directions. The multi-directional antenna has an antenna 1 in one direction and an antenna 4 in another direction, but is not limited to such antennas. The multi-directional antenna may also include an antenna 2 and an antenna 3 disposed in other directions. The microwave relay node receives a microwave signal from a previous microwave node by the antenna 1, transmits the microwave signal to the antenna 4, and transmits the microwave signal to a next microwave node by the antenna 4. The previous microwave node may be a microwave relay node or a microwave source node, and the next microwave node may be a microwave relay node or a microwave destination node.

As shown by the solid lines in FIG. 10, the antenna 1 receives a microwave signal transmitted by a previous microwave node and sends the microwave signal to a low noise amplifier (LNA) 1002 through a duplexer 1001; the LNA 1002 amplifies the microwave signal and outputs the signal to a down-converter 1003; the down-converter 1003 down-converts the microwave signal to obtain a signal at the intermediate frequency band and outputs the signal at the intermediate frequency band on two paths, one path is to a high-pass filter 1004 and the other path is to a low-pass filter 1005.

The high-pass filter 1004 performs high-pass filtering on the signal at the intermediate frequency band to obtain the service information at the intermediate frequency band and outputs the service information to a switch matrix; and the low-pass filter 1005 performs low-pass filtering on the signal at the intermediate frequency band to obtain the first control information at the low frequency band and outputs the first control information to an A/D demodulator 1006 to convert the first control information from an analog signal mode to a digital signal mode.

Then, the first control information in the form of digital signal mode is sent to a controller 1007. The controller 1007 converts the first control information to a control signal according to a control protocol pre-stored in the controller 1007 and uses the control signal to turn on a switch in the switch matrix. Specifically, the control protocol includes routing information for transmission of the microwave signal, and which switch in the switch matrix should be turned on may be known according to the routing information. The control signal may be a series of high- and low-level signals. When the control signal corresponding, to a switch in the switch matrix is at a high level, the switch is turned on. Otherwise, when the control signal corresponding to a switch in the switch matrix is at a low level, the switch is turned off.

Figure 11:
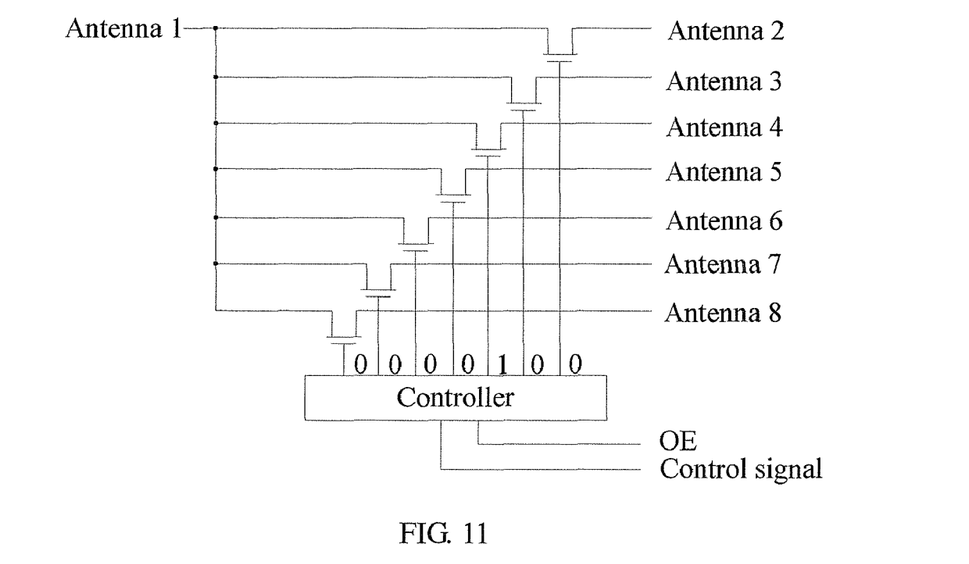
FIG. 11 is a schematic structure diagram of a switch matrix in FIG. 10.

For example, as shown in FIG. 11, if it is known that the switch corresponding to the antenna 4 in the switch matrix should be turned on according to the routing information, the level corresponding to the antenna 4 in the control signal is high and the level corresponding to other antennas is low at this time, therefore the switch corresponding to the antenna 4 should be turned on, while switches corresponding to other antennas should be turned off. In this case, the service information received by the antenna 1 may be sent to the antenna 4 through the switch matrix and then transmitted by the antenna 4 to a next microwave node, so that the scheduling of the service is implemented.

Specifically, the antenna 4 transmits the service information to the next microwave node as follows: According to the pre-stored control protocol, the controller 1007 generates a control signal used to control the turn-on of a switch in the switch matrix of the next microwave node; and a digital/analog (D/A) modulator 1008 modulates the control signal onto a low frequency carrier to generate second control information at the low frequency band and outputs the second control information to an up-converter 1009. The frequency of the low frequency carrier may be several kilohertz, and the low frequency carrier may be a sine wave or square wave.

The up-converter 1009 up-converts the second control information at the low frequency band and the service information at the intermediate frequency band to perform mixed-frequency modulation to thereby obtain a microwave signal at the RF band. Then the microwave signal is outputted to a preamplifier 1010 and a power amplifier 1011 in sequence. The preamplifier 1010 and the power amplifier 1011 amplify the microwave signal and output it to the duplexer 1001. The duplexer 1001 outputs the signal to the antenna 4 and finally, the antenna 4 transmits the microwave signal.

It should be noted that the embodiment of the present invention may also separate the service information and the control information by the LNA 1002. In addition, in the embodiment of the present invention, the signal may also be modulated by the preamplifier 1010 or power amplifier 1011.

In the microwave relay node:

the receiving unit 701 is specifically the antenna 1;

the separating unit 702 may include the LNA 1002, down-converter 1003, high-pass filter 1004, low-pass filter 1005, and A/D demodulator 1006;

the controlling unit 703 may be specifically the controller 1007;

the control information generating unit 801 may include the controller 1007 and the D/A modulator 1008;

the mixing unit 802 may include the up-converter 1009, preamplifier 1010, and power amplifier 1011; and the transmitting unit 803 may be specifically the antenna 4.

The embodiment of the present invention is not limited thereto. Alternatively, as shown by the dotted lines in FIG. 10, the antenna 4 may receive a microwave signal from a previous microwave node and sends the microwave signal to the antenna 1, and the antenna 1 transmits the microwave signal to the next microwave node. In this case, the receiving unit 701 is the antenna 4, while the transmitting unit 803 is the antenna 1.

Detailed above are only exemplary embodiments of the present invention, but the scope of the present invention is not limited thereto. Any modification or substitution readily conceivable by those skilled in the art within the scope of the technology disclosed by the present invention shall fall within the scope of the present invention. Therefore, the scope of the present invention is subject to the appended claims.

What is claimed is:

1. A microwave relay receiving method, comprising:
receiving a microwave signal at a radio frequency band, wherein the microwave signal at the radio frequency band comprises service information and control information;
separating the microwave signal at the radio frequency band to obtain the service information at an intermediate frequency band and the control information at a low frequency band, wherein the separating comprises,
down-converting the microwave signal at the radio frequency band,
performing high-pass filtering on one portion of the down-converted microwave signal to obtain the service information at an intermediate frequency band, and
performing low-pass filtering and analog/digital (A/D) demodulation on the other portion of the down-converted microwave signal to obtain the control information at a low frequency band;
sending the service information at the intermediate frequency band to a switch matrix, wherein the switch matrix is connected between a relay receiving apparatus of the microwave signal and a relay transmitting apparatus of the microwave signal and used to schedule and distribute the service information at the intermediate frequency band;
controlling the switch matrix by using the control information at the low frequency band so that a corresponding switch in the switch matrix is turned on and the service information at the intermediate frequency band is transmitted via the turned on switch to the relay transmitting apparatus.

2. The microwave relay receiving method according to claim 1, wherein the controlling the switch matrix by using the control information at the low frequency band comprises:
converting the control information at the low frequency band to a control signal according to a pre-stored control protocol and sending the control signal to the switch matrix, wherein the control signal is used to control turn-on of the corresponding switch in the switch matrix.

3. The microwave relay receiving method according to claim 2, wherein: the control protocol comprises routing information for transmission of the microwave signal, and the control signal is used to control turn-on of a switch corresponding to the routing information in the switch matrix.

4. An apparatus in a microwave communication system, comprising:
a receiving unit, configured to receive a microwave signal at a radio frequency band, wherein the microwave signal at the radio frequency band comprises service information and control information;
a separating unit, configured to:
separate the microwave signal at the radio frequency band to obtain the service information at an intermediate frequency band and the control information at a low frequency band, comprising,
down-convert the microwave signal at the radio frequency band,
perform high-pass filtering on one portion of the down-converted microwave signal to obtain the service information at an intermediate frequency band, and
perform low-pass filtering and analog/digital (A/D) demodulation on the other portion of the down-converted microwave signal to obtain the control information at a low frequency band, and
send the service information at the intermediate frequency band to a switch matrix, wherein the switch matrix is used to schedule and distribute the service information at the intermediate frequency band; and
a controlling unit, configured to control the switch matrix by using the control information at the low frequency band so that a corresponding switch in the switch matrix is turned on and the service information at the intermediate frequency band is transmitted via the turned on switch to a transmitting apparatus.

5. The apparatus according to claim 4, wherein the separating unit comprises:
a down-converter configured to down-convert the microwave signal at the radio frequency band to output a combination of the service information at the intermediate frequency band and the control information at the low frequency;
a high-pass filter, coupled to the down-converter and the switch matrix, configured to receive some portion of the combination and output the service information at the intermediate frequency band to the switch matrix;
a low-pass filter, coupled to the down-converter and the switch matrix, configured to receive some portion of the combination and output the control information at the low frequency band.

6. The apparatus according to claim 4, wherein the controlling unit is configured to convert the control information at the low frequency band to a control signal according to a pre-stored control protocol and send the control signal to the switch matrix, wherein the control signal is used to control turn-on of the corresponding switch in the switch matrix.

7. The apparatus according to claim 6, wherein if the control protocol comprises routing information for transmission of the microwave signal, the control signal is used to control turn-on of a switch corresponding to the routing information in the switch matrix.

* * * * *